United States Patent
Lee

(10) Patent No.: US 7,305,494 B2
(45) Date of Patent: Dec. 4, 2007

(54) MULTIPLEXED COMPUTER PERIPHERAL DEVICE CONNECTION SWITCHING INTERFACE

(75) Inventor: Chun-Liang Lee, Taipei (TW)

(73) Assignee: Inventec Corporation (TW)

( * ) Notice: Subject to any disclaimer, the term of this patent is extended or adjusted under 35 U.S.C. 154(b) by 58 days.

(21) Appl. No.: 11/391,815

(22) Filed: Mar. 28, 2006

(65) Prior Publication Data

US 2007/0101029 A1    May 3, 2007

(30) Foreign Application Priority Data

Oct. 31, 2005    (TW) .................................. 94138052

(51) Int. Cl.
*G06F 3/00* (2006.01)

(52) U.S. Cl. ..................... 710/10; 710/316; 709/230
(58) Field of Classification Search ............ 710/10–12, 710/15, 301, 302, 304, 316–317; 709/222, 709/230
See application file for complete search history.

(56) References Cited

U.S. PATENT DOCUMENTS

| | | |
|---|---|---|
| 6,609,034 B1 * | 8/2003 | Behrens et al. ............... 700/19 |
| 2005/0289403 A1 * | 12/2005 | Rothman et al. ............. 714/56 |
| 2007/0088841 A1 * | 4/2007 | de Kerf ...................... 709/230 |

* cited by examiner

*Primary Examiner*—Clifford Knoll
(74) *Attorney, Agent, or Firm*—Peter F. Corless; Steven M. Jensen; Edwards Angell Palmer & Dodge LLP

(57) ABSTRACT

A multiplexed computer peripheral device connection switching interface is proposed, which is designed for use with a clustering computer system equipped with a plurality of independent processing units, such as a blade server system equipped with a plurality of server modules; and which is characterized by the capability of allowing a set of peripheral devices (i.e., keyboard and mouse) to be shared by the multiple server modules in a multiplexed manner without having to utilize the more restrictive and lowly compatible USB-to-PS2 converter. This feature allows the multiplexed computer peripheral device connection switching interface of the invention to have a higher cross-platform capability across server platforms with different operating systems.

9 Claims, 3 Drawing Sheets

MULTIPLEXED COMPUTER PERIPHERAL DEVICE CONNECTION SWITCHING INTERFACE

BACKGROUND OF THE INVENTION

1. Field of the Invention

This invention relates to computer peripheral technology, and more particularly, to a multiplexed computer peripheral device connection switching interface which is designed for use in conjunction with a clustering computer system equipped with a plurality of independent processing units, such as a blade server system equipped with a plurality of server modules, for the purpose of allowing the multiple server modules of the blade server system to share a common set of peripheral devices, such as a keyboard and a mouse, in a multiplexed manner.

2. Description of Related Art

Blade server is a clustering type of network server that is characterized by the use of a circuit board enclosure to integrate a cluster of server modules (commonly called "blades"), with all of these server modules providing the same server functionality. In other words, a blade server can respond to a client's request by linking any one of the clustered server modules to the client. In practical implementation, each server module is made into a single circuit board (i.e., blade), which can be easily fitted to the blade server's enclosure to increase the blade server's client serving capacity. Moreover, a blade server is typically equipped with a common management control module for controlling all the operations of the multiple server modules and their shared resources in the blade server.

A computer platform is typically equipped with a dedicated set of peripheral input devices, such as keyboard and mouse, which allow the user to input data and commands to the computer platform in the operations of applications or system management tasks. In network applications, blade servers are used as Web servers, file servers, E-mail servers, and so on. In such applications, since peripheral input devices are required only in the setup stage and are unnecessary during the server operation, keyboard and mouse are typically removed to save equipment cost and room space. For this sake, blade servers are typically unequipped with keyboard and mouse during actual operation, and the keyboard and the mouse are externally coupled to the blade server only when it is necessary to perform system management tasks on the blade server, such when one of the server modules suffers from system crash.

One solution to the foregoing need is to utilize a KVM (keyboard/video/mouse) switch that allows a blade server to be externally connected to a keyboard, a video display unit, and a mouse. However, for the blade server systems currently utilized by IESC (Inventec Enterprise System Corporation), the keyboard and the mouse are coupled to a PS/2 peripheral connecting unit; and in practical application, in order to couple the PS/2 peripheral connecting unit to a KVM switch, it requires the use of a USB-to-PS2 converter. One problem in the use of USB-to-PS2 converter, however, is that it would have low compatibility and cross-platform capability that only allows it to be usable on some specific blade server platforms and incompatible with other operating systems such as the Solaris server operating system.

SUMMARY OF THE INVENTION

It is therefore an objective of this invention to provide a multiplexed computer peripheral device connection switching interface which allows the multiple server modules in a blade server system to share a common set of peripheral devices without having to employ a USB-to-PS2 converter.

The multiplexed computer peripheral device connection switching interface according to the invention is designed for use in conjunction with a clustering computer system equipped with a plurality of independent processing units, such as a blade server system equipped with a plurality of server modules, for the purpose of allowing the multiple server modules of the blade server to share a common set of peripheral devices, such as a keyboard and a mouse, in a multiplexed manner.

In architecture, the multiplexed computer peripheral device connection switching interface according to the invention comprises: (A) a plurality of switching modules, each of which is linked to one of the multiple processing units of the clustering computer system, and each of which includes a first connecting port, a second connecting port, a third connecting port, and a control port, where the first connecting port is externally connected to the peripheral connecting unit, and the second connecting port is connected to an input/output controller of the associated one of the processing units; (B) a plurality of switching control modules, each of which is connected to one of the switching modules, and each of which is capable of issuing a switching control signal to the control port of its associated one of the switching modules for controlling the connection between the first connecting port, the second connecting port, and the third connecting port of its associated one of the switching modules; (C) a plug-in responding module, which is capable of responding to an event of the peripheral devices being plugged to the clustering computer system by commanding the chassis management unit to select one of the multiple processing units to serve as an initialization control unit and meanwhile issue an initialization enable message; (D) an initialization control module, which is capable of responding to the initialization enable message from the plug-in responding module by commanding the associated switching module of the selected processing unit to connect its first connecting port to the third connecting port so as to allow the peripheral devices to be linked via the switching module to the chassis management unit for the chassis management unit to perform an initialization procedure on the peripheral devices; (E) a configuration setting module, which is capable of being activated after the initialization procedure performed by the initialization control module is completed, and which is capable of commanding each of the switching modules to connect its second connecting port to the third connecting port so as to link each of the switching control modules to its associated one of the input/output controller for the purpose of allowing the chassis management unit to be capable of transferring a set of configuration data about the peripheral devices via each of the switching control modules to the central processing unit in each one of the processing units for the purpose of setting each central processing unit to be capable of linking with the peripheral devices; and (F) a peripheral linking control module, which is capable of being activated after the configuration setting procedure performed by the configuration setting module is completed, and which is capable of responding to a user-initiated processing unit selecting event which selects a certain one of the processing units by commanding the associated one of the switching modules to connect its first connecting port to the second connecting port so as to link the peripheral devices to the input/output controller and thereby allow the peripheral devices to be linked to the user-selected one of the processing units.

The multiplexed computer peripheral device connection switching interface according to the invention is characterized by the capability of allowing a set of peripheral devices (i.e., keyboard and mouse) to be shared by the multiple server modules in a multiplexed manner without having to utilize the more restrictive and lowly compatible USB-to-PS2 converter. This feature allows the multiplexed computer peripheral device connection switching interface of the invention to have a higher cross-platform capability across server platforms with different operating systems. The invention is therefore more advantageous to use than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The multiplexed computer peripheral device connection switching interface according to the invention is disclosed in full details by way of preferred embodiments in the following with reference to the accompanying drawings.

Figure 1:
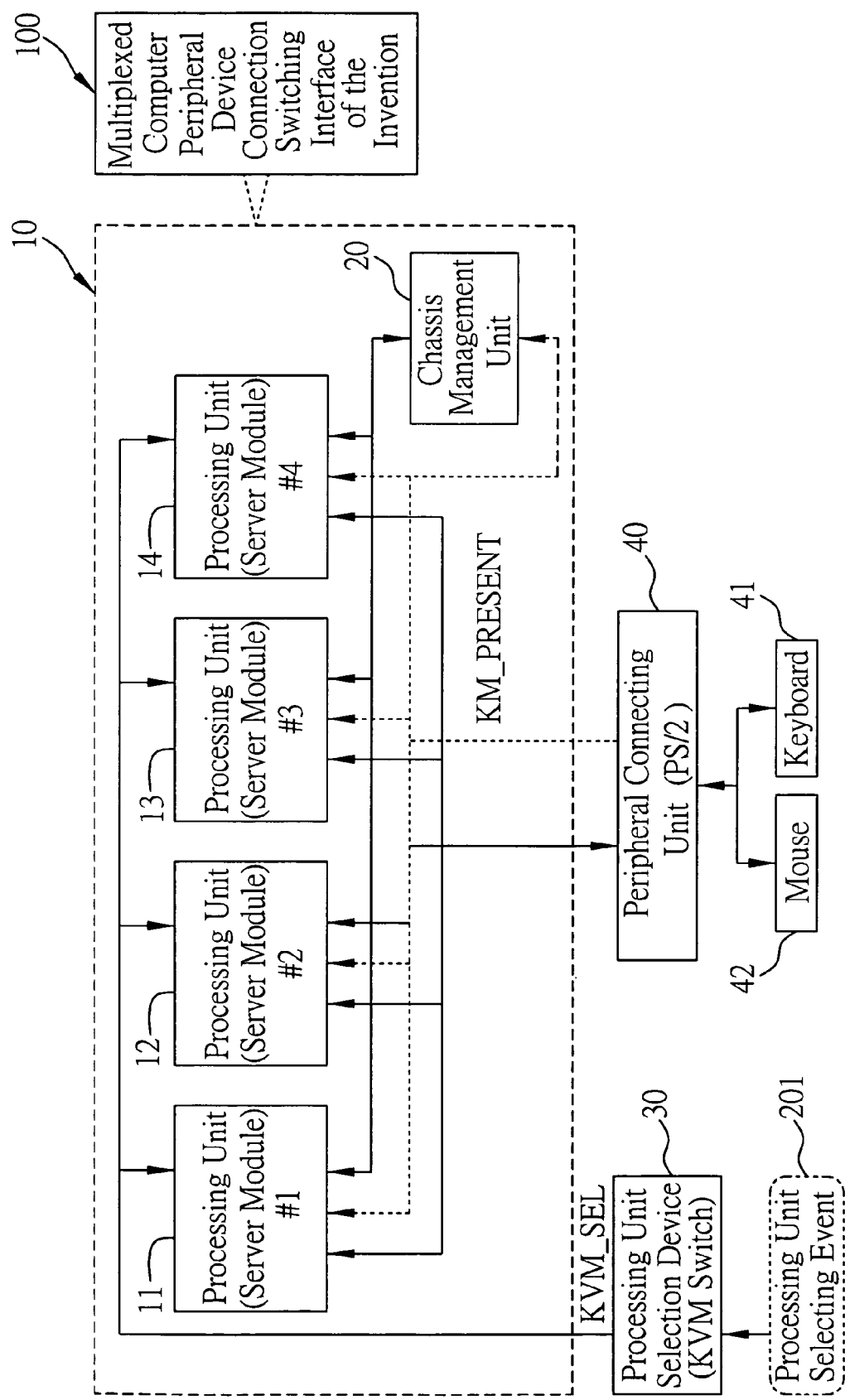
FIG. 1 is a schematic diagram showing the application of the multiplexed computer peripheral device connection switching interface according to the invention in conjunction with a blade server system.

FIG. 1 is a schematic diagram showing the application of the multiplexed computer peripheral device connection switching interface of the invention 100. As shown, in practical application, the multiplexed computer peripheral device connection switching interface of the invention 100 is integrated to a clustering computer system, such as a blade server system 10, that is equipped with a number of independent data processing units, such as a number of server modules 11, 12, 13, 14 (note that FIG. 1 demonstratively shows only 4 server modules 11, 12,13, 14; but in practice, the number of server modules is unrestricted), wherein these server modules 11, 12, 13, 14 are together controlled by a chassis management unit 20. In operation, the multiplexed computer peripheral device connection switching interface of the invention 100 allows the multiple server modules 11, 12, 13, 14 of the blade server system 10 to share a common set of peripheral devices, such as a keyboard 41 and a mouse 42, in a multiplexed manner via a peripheral connecting unit, such as a PS/2 peripheral connecting unit 40. In practical implementation, the chassis management unit 20 is based on an IPMB (Intelligent Platform Management Bus) bus architecture for linking to the server modules 11, 12, 13, 14.

In practical application, the user (i.e., network system management personnel) can utilize a processing unit selection device 30, such as a KVM (Keyboard/Video/Mouse) switch, to select a desired one of the server modules 11, 12, 13, 14 for selectively linking the peripheral devices, i.e., keyboard 41 and mouse 42, to the user-selected one of the server modules 11, 12, 13, 14 so as to allow the user to operate the selected one of the server modules 11, 12, 13, 14 with the keyboard 41 and the mouse 42.

Figure 2:
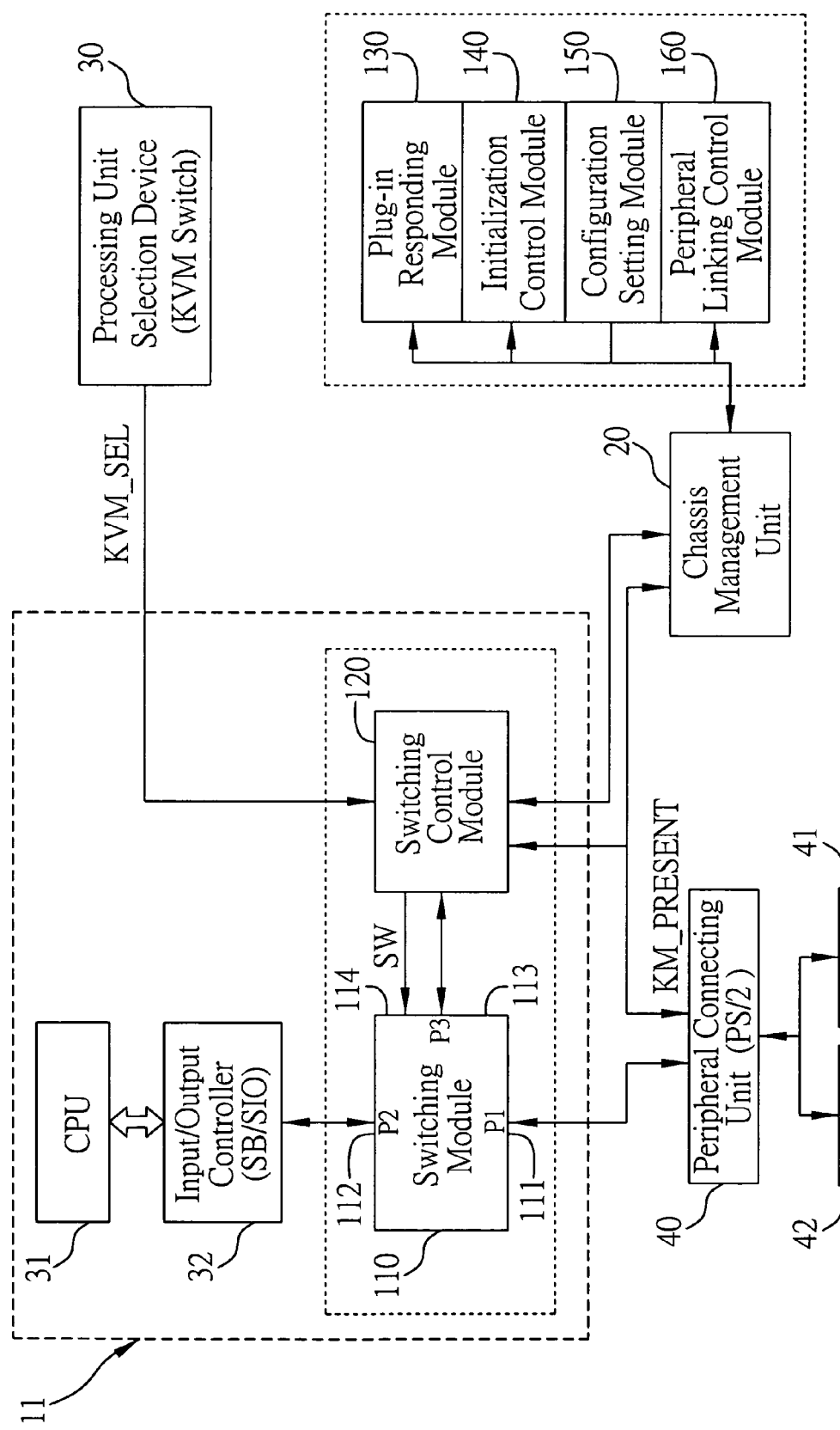
FIG. 2 is a schematic diagram showing the internal architecture of the multiplexed computer peripheral device connection switching interface according to the invention.

As shown in FIG. 2, the modularized component model of the multiplexed computer peripheral device connection switching interface of the invention 100 comprises: (A) a plurality of switching modules 110; (B) a plurality of switching control modules 120; (C) a plug-in responding module 130; (D) an initialization control module 140; (E) a configuration setting module 150; and (F) a peripheral linking control module 160. Firstly, the respective attributes and behaviors of the constituent modules 110, 120, 130,140, 150, 160 of the multiplexed computer peripheral device connection switching interface of the invention 100 are described in details in the following.

The switching modules 110 are respectively integrated to the multiple server modules 11, 12, 13, 14 in the blade server system 10, and each of which includes a first connecting port (P1) 111, a second connecting port (P2) 112, a third connecting port (P3) 113, and a control port 114; wherein the first connecting port (P1) 111 is externally connected to the PS/2 peripheral connecting unit 40; the second connecting port (P2) 112 is internally connected to an integral input/output controller 32, such as an SB/SIO (Southbridge and Super Input/Output) compliant I/O controller, in the associated one of the server modules 11, 12, 13, 14; and the third connecting port (P3) 113 and the control port 114 are both connected to the associated one of the switching control modules 120 which are respectively integrated to the server modules 11, 12, 13, 14.

Figure 3A:
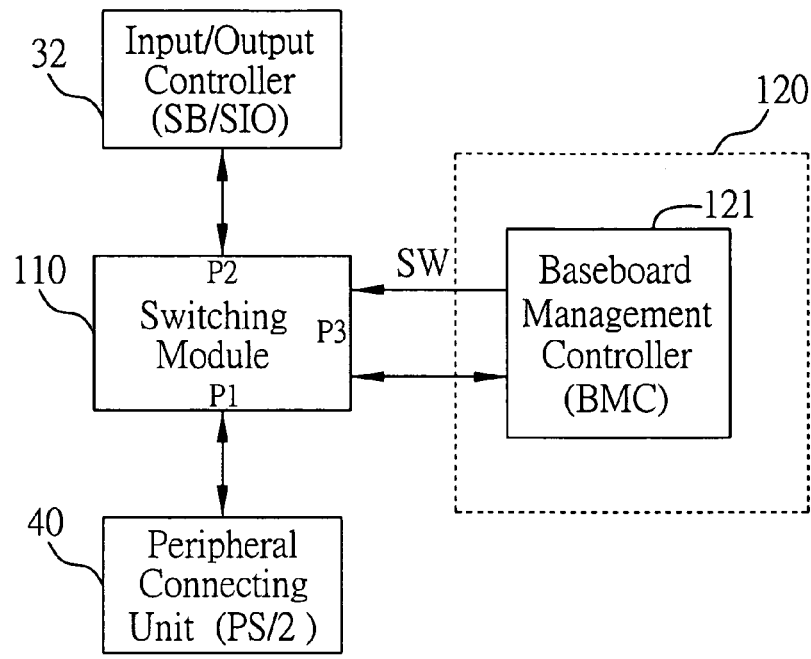
FIG. 3A is a schematic diagram showing a first preferred embodiment of a switching control module utilized by the multiplexed computer peripheral device connection switching interface of the invention.
Figure 3B:
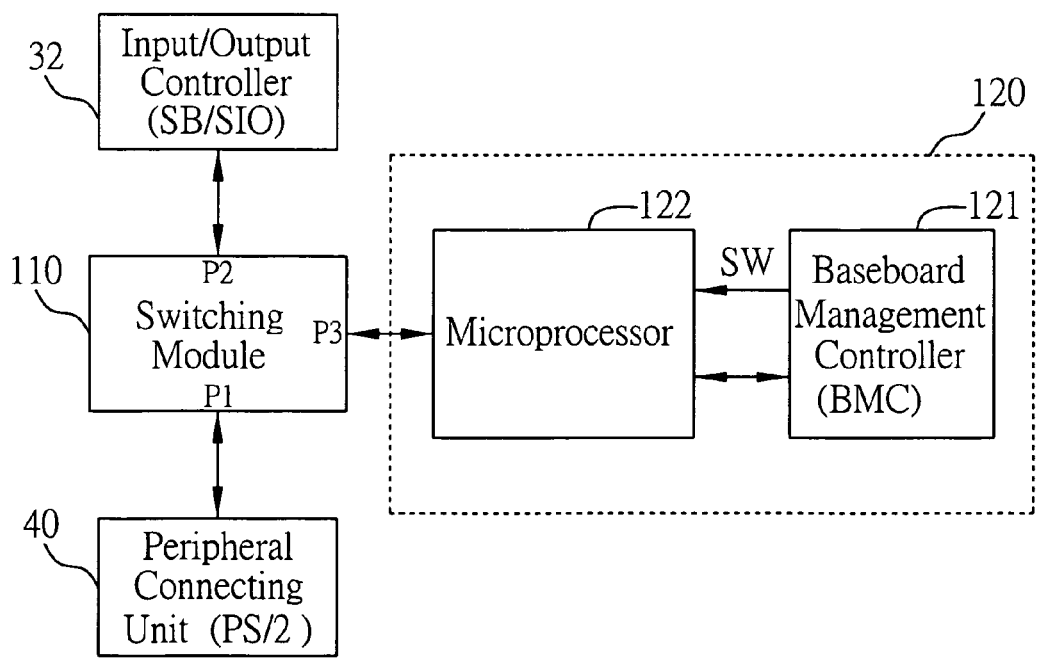
FIG. 3B is a schematic diagram showing a second preferred embodiment of a switching control module utilized by the multiplexed computer peripheral device connection switching interface of the invention.

The switching control modules 120 are respectively integrated to the server modules 11, 12, 13, 14 and are each connected to one of the switching modules 110. In operation, these switching control modules 120 are each capable of issuing a switching control signal SW to the control port 114 of its associated one of the switching modules 110 for controlling the connection between the first connecting port (P1) 111, the second connecting port (P2) 112, and the third connecting port (P3) 113 thereof. In practical implementation, the switching control modules 120 can be embodied in two different manners respectively shown in FIG. 3A and FIG. 3B. In the embodiment of FIG. 3A, each switching control module 120 is an IPMI (Intelligent Platform Management Interface) compliant BMC (Baseboard Management Controller) unit 121, which is used both to receive and process a selection signal KVM_SEL and a keyboard-mouse-present signal KM_PRESENT and to control the associated switching module 110 to perform a switching action. In the embodiment of FIG. 3B, the switching control modules 120 is composed of a BMC unit 121 and a microprocessor 122, where the BMC unit 121 is only used to receive and process the selection signal KVM_SEL and the keyboard-mouse-present signal KM_PRESENT, while the microprocessor 122 is used to control the associated switching module 110 to perform a switching action.

The plug-in responding module 130 is designed to respond to an event of the keyboard 41 and mouse 42 being plugged to the blade server system 10 by commanding the chassis management unit 20 to select a default one of the multiple server modules 11, 12, 13, 14 (for example, the first server module 11) to serve as an initialization control unit and meanwhile issue an initialization enable message to the initialization control module 140.

The initialization control module 140 is designed to respond to the initialization enable message from the plug-in responding module 130 by commanding the associated switching module 110 of the selected first server module 11 to connect its first connecting port (P1) 111 to the third connecting port (P3) 113 so as to allow the keyboard 41 and the mouse 42 to be linked via the switching module 110 to the chassis management unit 20 for the chassis management unit 20 to perform an initialization procedure for the keyboard 41 and the mouse 42.

The configuration setting module 150 is designed to be activated after the initialization procedure performed by the initialization control module 140 is completed, and which is then capable of commanding each of the switching modules 110 to connect its second connecting port (P2) 112 to the third connecting port (P3) 113 so as to link each of the switching control modules 120 to its associated one of the SB/SIO input/output controller 32 for the purpose of allowing the chassis management unit 20 to be capable of transferring a set of configuration data obtained from the initialization procedure via each of the switching control modules 120 to the central processing unit 31 in each one of the server modules 11, 12, 13, 14, for the purpose of setting each central processing unit 31 to be capable of linking with the keyboard 41 and the mouse 42.

The peripheral linking control module 160 is designed to be activated after the configuration setting procedure performed by the configuration setting module 150 is completed, and which is then capable of responding to a user-initiated processing unit selecting event 201, i.e., an event of the user selecting a desired one of the server modules 11, 12, 13, 14 by using the processing unit selection device (KVM switch) 30, by commanding the associated one of the switching modules 110 to connect its first connecting port (P1) 111 to the second connecting port (P2) 112 so as to link the keyboard 41 and the mouse 42 to the SB/SIO input/output controller 32 and thereby allow the keyboard 41 and the mouse 42 to be linked to the user-selected one of the server modules 11, 12, 13, 14.

The following is a detailed description of a practical example of the application of the multiplexed computer peripheral device connection switching interface of the invention 100 during actual operation. In this application example, it is assumed that the user plugs both the keyboard 41 and the mouse 42 to the PS/2 peripheral connecting unit 40 for connection to the blade server system 10.

Referring to FIG. 1 together with FIG. 2, when the keyboard 41 and the mouse 42 are plugged to the PS/2 peripheral connecting unit 40, it will cause the PS/2 peripheral connecting unit 40 to issue a keyboard-mouse-present signal KM_PRESENT to each of the server modules 11, 12, 13, 14, and meanwhile activate the plug-in responding module 130 to respond by commanding the chassis management unit 20 to select a default one of the multiple server modules 11, 12, 13, 14 (for example, the first server module 11) to serve as an initialization control unit and meanwhile issue an initialization enable message to the initialization control module 140, causing the initialization control module 140 to respond by commanding the associated switching module 110 of the selected first server module 11 to connect its first connecting port (P1) 111 to the third connecting port (P3) 113 so as to allow the keyboard 41 and the mouse 42 to be linked via the switching module 110 to the chassis management unit 20 for the chassis management unit 20 to perform an initialization procedure for the keyboard 41 and the mouse 42. After the initialization procedure performed by the initialization control module 140 is completed, the configuration setting module 150 is activated to command each of the switching modules 110 to connect its second connecting port (P2) 112 to the third connecting port (P3) 113 so as to link each of the switching control modules 120 to its associated one of the SB/SIO input/output controller 32 for the purpose of allowing the chassis management unit 20 to be capable of transferring a set of configuration data (i.e., the configuration data about the keyboard 41 and the mouse 42) via each of the switching control modules 120 to the central processing unit 31 in each one of the server modules 11, 12, 13, 14, for the purpose of setting each central processing unit 31 to be capable of linking with the keyboard 41 and the mouse 42.

After that, the user is able to utilize the keyboard 41 and the mouse 42 to operate a selected one of the server modules 11, 12, 13, 14. It is assumed that the user wants to operate the second server module 12 with the keyboard 41 and the mouse 42. In this case, the user can utilize the processing unit selection device 30, i.e., KVM switch, to choose the second server module 12. This action will cause the occurrence of a user-initiated processing unit selecting event 201, which initiates the peripheral linking control module 160 to respond by commanding the associated one of the switching modules 110 to connect its first connecting port (P1) 111 to the second connecting port (P2) 112 so as to link the keyboard 41 and the mouse 42 to the SB/SIO input/output controller 32 and thereby allow the keyboard 41 and the mouse 42 to be linked to the user-selected second server module 12. This allows the user to utilize the keyboard 41 and the mouse 42 to operate the second server module 12.

Next, if the user wants to perform system management tasks on the third server module 13, the user can likewise utilize the processing unit selection device (KVM switch) 30 to choose the third server module 13, and the peripheral linking control module 160 will responsively command the associated one of the switching modules 110 to connect its first connecting port (P1) 111 to the second connecting port (P2) 112 so as to link the keyboard 41 and the mouse 42 to the SB/SIO input/output controller 32 of the third server module 13 and thereby allow the keyboard 41 and the mouse 42 to be linked to the user-selected third server module 13.

In conclusion, the invention provides a multiplexed computer peripheral device connection switching interface which is designed for use with a clustering computer system equipped with a plurality of independent processing units, such as a blade server system equipped with a plurality of server modules; and which is characterized by the capability of allowing a set of peripheral devices (i.e., keyboard and mouse) to be shared by the multiple server modules in a multiplexed manner without having to utilize the more restrictive and lowly compatible USB-to-PS2 converter. This feature allows the multiplexed computer peripheral device connection switching interface of the invention to have a higher cross-platform capability across server platforms with different operating systems. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A multiplexed computer peripheral device connection switching interface for use with a clustering computer system equipped with a chassis management unit and a plurality of independent processing units which are connected via a common peripheral connecting unit to a set of peripheral devices for the purpose of allowing the multiple processing units of the clustering computer system to share the peripheral devices in a multiplexed manner;

the multiplexed computer peripheral device connection switching interface comprising:

a plurality of switching modules, each of which is linked to one of the multiple processing units of the clustering computer system, and each of which includes a first connecting port, a second connecting port, a third connecting port, and a control port, where the first connecting port is externally connected to the peripheral connecting unit, and the second connecting port is connected to an input/output controller of the associated one of the processing units;

a plurality of switching control modules, each of which is connected to one of the switching modules, and each of which is capable of issuing a switching control signal to the control port of its associated one of the switching modules for controlling the connection between the first connecting port, the second connecting port, and the third connecting port of its associated one of the switching modules;

a plug-in responding module, which is capable of responding to an event of the peripheral devices being plugged to the clustering computer system by commanding the chassis management unit to select one of the multiple processing units to serve as an initialization control unit and meanwhile issue an initialization enable message;

an initialization control module, which is capable of responding to the initialization enable message from the plug-in responding module by commanding the associated switching module of the selected processing unit to connect its first connecting port to the third connecting port so as to allow the peripheral devices to be linked via the switching module to the chassis management unit for the chassis management unit to perform an initialization procedure on the peripheral devices;

a configuration setting module, which is capable of being activated after the initialization procedure performed by the initialization control module is completed, and which is capable of commanding each of the switching modules to connect its second connecting port to the third connecting port so as to link each of the switching control modules to its associated one of the input/output controller for the purpose of allowing the chassis management unit to be capable of transferring a set of configuration data about the peripheral devices via each of the switching control modules to the central processing unit in each one of the processing units for the purpose of setting each central processing unit to be capable of linking with the peripheral devices; and a peripheral linking control module, which is capable of being activated after the configuration setting procedure performed by the configuration setting module is completed, and which is capable of responding to a user-initiated processing unit selecting event which selects a certain one of the processing units by commanding the associated one of the switching modules to connect its first connecting port to the second connecting port so as to link the peripheral devices to the input/output controller and thereby allow the peripheral devices to be linked to the user-selected one of the processing units.

2. The multiplexed computer peripheral device connection switching interface as recited in claim 1, wherein the clustering computer system is a blade server system.

3. The multiplexed computer peripheral device connection switching interface as recited in claim 1, wherein the set of peripheral devices include a keyboard and a mouse.

4. The multiplexed computer peripheral device connection switching interface as recited in claim 1, wherein the peripheral connecting unit is a PS/2-compliant peripheral connecting unit.

5. The multiplexed computer peripheral device connection switching interface as recited in claim 1, wherein the chassis management unit is based on an IPMB (Intelligent Platform Management Bus) bus architecture for linking to each of the processing units.

6. The multiplexed computer peripheral device connection switching interface as recited in claim 1, wherein the input/output controller is a Southbridge and SIO (Super Input/Output) controller.

7. The multiplexed computer peripheral device connection switching interface as recited in claim 1, wherein in the user-initiated processing unit selecting event, a processing unit selection device is utilized for selecting the user-desired processing unit, and wherein the processing unit selection device is a KVM (Keyboard/Video/Mouse) switch.

8. The multiplexed computer peripheral device connection switching interface as recited in claim 1, wherein the switching control modules are each an IPMI (Intelligent Platform Management Interface) compliant BMC (Baseboard Management Controller) unit.

9. The multiplexed computer peripheral device connection switching interface as recited in claim 1, wherein each of the switching control modules includes:

an IPMI (Intelligent Platform Management Interface) compliant BMC (Baseboard Management Controller) unit, which is under control of the chassis management unit 20 for receiving a set of related control signals; and a microprocessor, which is under control of the BMC unit for controlling the associated one of the switching modules to perform request switching actions.

* * * * *